Aug. 18, 1959 E. H. MORELAND 2,899,835
HAND CONTROL FOR AUTOMOBILE BRAKE AND ACCELERATOR PEDALS
Filed Nov. 5, 1957 2 Sheets-Sheet 1
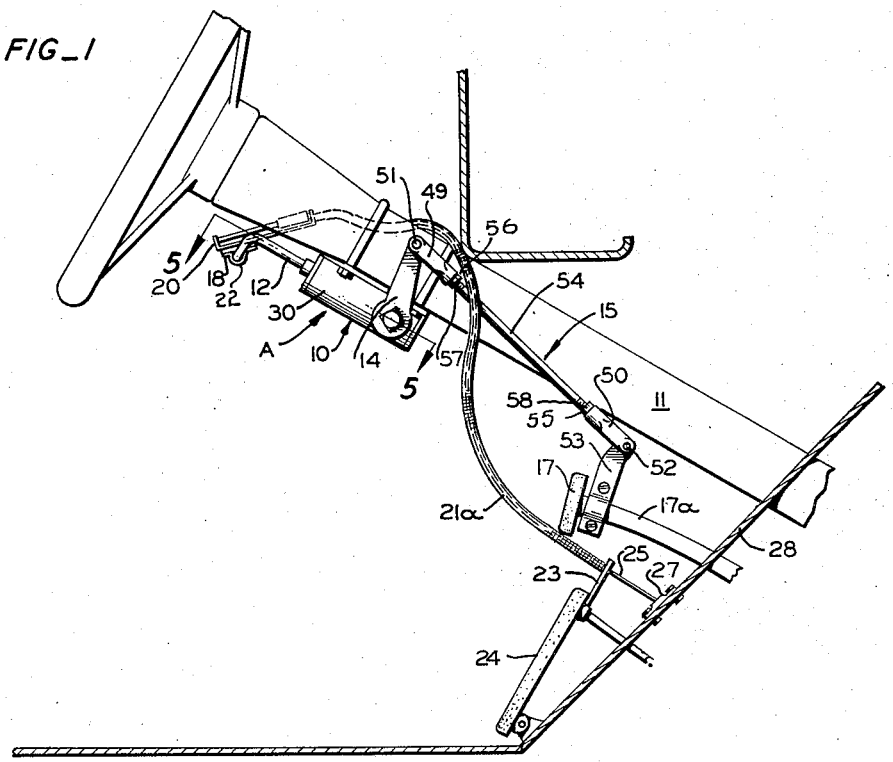
FIG_1
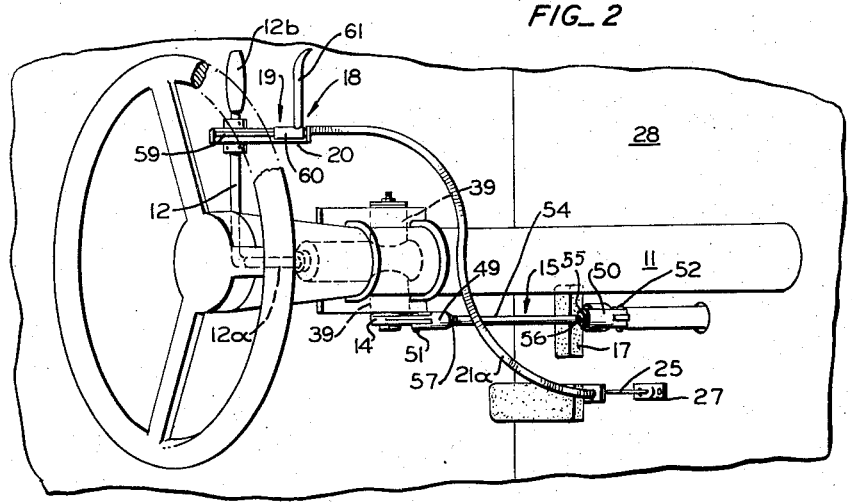
FIG_2
INVENTOR.
ETHELBERT H. MORELAND
BY
ATTORNEYS Aug. 18, 1959           E. H. MORELAND           2,899,835
HAND CONTROL FOR AUTOMOBILE BRAKE AND ACCELERATOR PEDALS
Filed Nov. 5, 1957           2 Sheets-Sheet 2
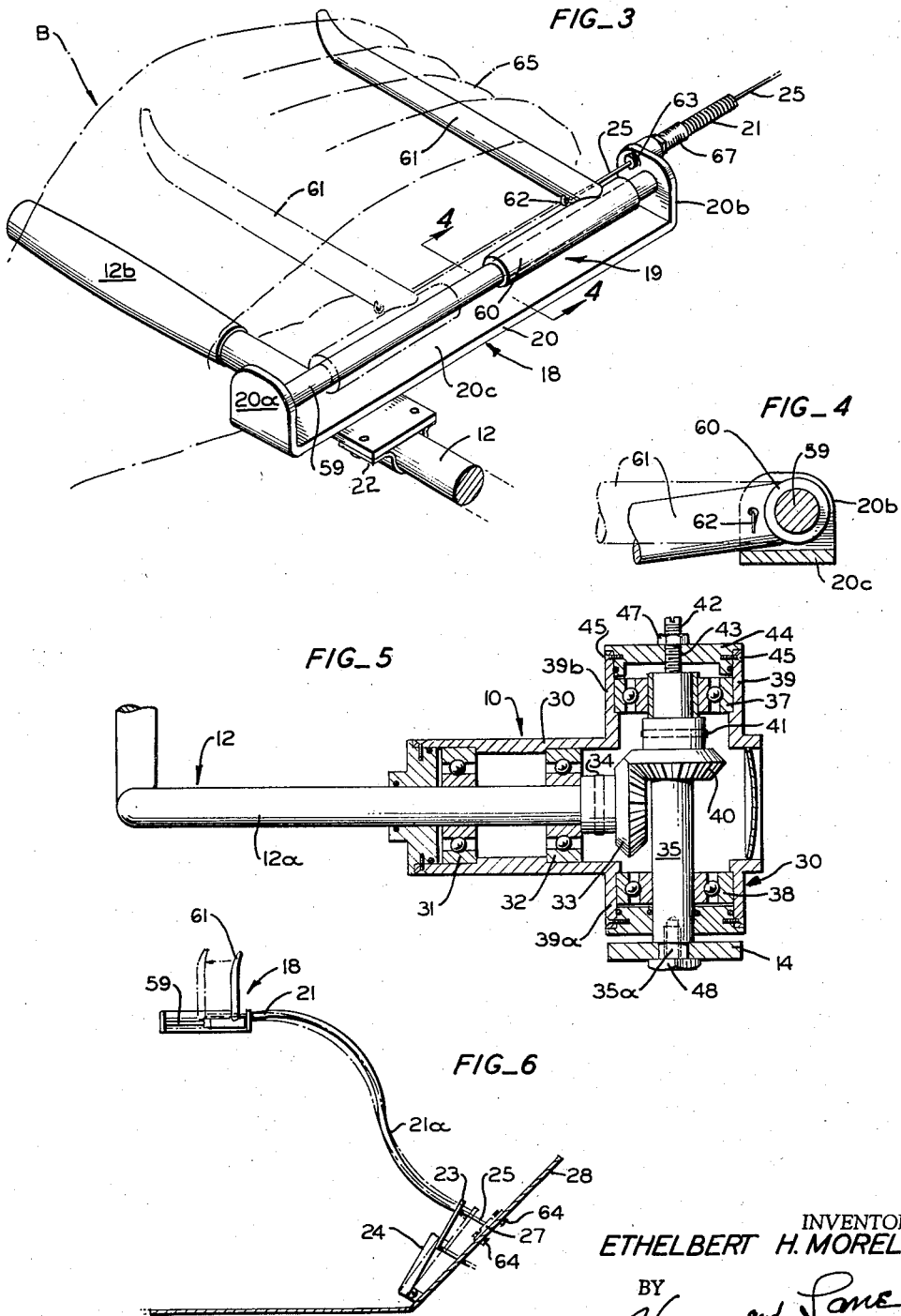
INVENTOR.
ETHELBERT H. MORELAND
BY
ATTORNEYS

United States Patent Office 2,899,835
Patented Aug. 18, 1959

2,899,835

HAND CONTROL FOR AUTOMOBILE BRAKE AND ACCELERATOR PEDALS

Ethelbert H. Moreland, San Jose, Calif.

Application November 5, 1957, Serial No. 694,579

3 Claims. (Cl. 74—481)

The present invention relates to control mechanism, and pertains more particularly to a hand control mechanism for automobiles and to a new mechanical principle for producing a thrusting action.

In the United States a great many people drive automobiles who have little or no muscular control of their legs. With such drivers, it is necessary that the entire control mechanism of the automobile be operated manually.

In the past, various mechanisms have been developed to facilitate operating the control mechanism of an automobile entirely by use of the hands, but some such mechanisms have not been entirely satisfactory in their operation.

The present invention provides an improved and simplified mechanism for operating manually the brake and accelerator pedals of an automobile. The invention also provides a single lever control having a hand grip mechanism mounted thereon for selectively operating the brake and accelerator pedals of an automobile. A further object of the invention is to provide an improved wire and tube control mechanism which will exert pressure by means of a flexible tube upon a contraction of a length of the wire mounted therein. A further object of the invention is to provide a simple, strong, positive manual control mechanism for an automobile, which mechanism may be easily and securely mounted on the steering post of an automobile.

These, and other objects and advantages of the invention, will be apparent from the following description and the accompanying drawings, consisting of two sheets, wherein:

Fig. 1 is a fragmentary side elevational view of a steering wheel and column assembly with a control mechanism embodying the present invention mounted thereon, and operatively connected to a brake pedal and an accelerator pedal, a segment of the flooring of the driver's compartment of the automobile being shown sectionally, portions being broken away.

Fig. 2 is a fragmentary plan view of the mechanism shown in Fig. 1, portions being broken away.

Fig. 3 is a fragmentary perspective view showing the accelerator pedal grip control mechanism as it appears when mounted on the brake control lever arm and showing, in solid lines, the grip control mechanism in unoperated, normal condition and, in broken lines, in retracted, operated condition, portions being broken away, and a driver's hand being shown in broken lines.

Fig. 4 is an enlarged, fragmentary, sectional view taken along line 4—4 of Fig. 3, showing, in broken lines, the grip control member swung upwardly clear of its base frame to permit free slidable movement of the grip member, and, in solid lines, in downwardly swung, frictional engagement with the base frame to retain the grip member in adjusted position.

Fig. 5 is an enlarged, fragmentary, sectional view taken along line 5—5 of Fig. 1.

Fig. 6 is a fragmentary diagrammatic view in reduced scale of the accelerator pedal grip control mechanism, showing, in solid lines, the parts in normal, unoperated condition and, in broken lines, in operated, or accelerating, condition.

Briefly, a control mechanism A embodying the present invention comprises gearing 10 secured to the steering post 11 of an automobile in which the control mechanism is to be embodied. A single control lever 12 extends from the gearing 10, and, as illustrated, is positioned for easy gripping by the left hand B (Fig. 3) of the driver of an automobile on which the mechanism A is mounted. Swinging the control lever 12 upwardly away from the driver causes a lever arm 14 operatively connected through the gearing 10 to the control lever 12, to swing downwardly. A thrust link 15, connected between the free end of the lever arm 14 and the automobile's brake pedal 17, urges the latter downwardly toward brake-applying position.

A throttle control grip assembly 18 is secured in adjusted position to the control lever 12 for gripping by the same hand B as that which operates the control lever 12. The control grip assembly 18 comprises a grip actuated member 19 slidably mounted on a frame 20. The frame 20 is secured in adjusted position on the lever 12 by a clamp 22.

A helical wire tube 21, with the adjacent convolutions thereof abutting each other so that the tube is non-compressible lengthwise, is mounted with its upper end adjustably secured to the frame 20, and its lower end fixedly secured to an extension bracket 23 mounted on the free end of the automobile's accelerator pedal 24.

A tension wire 25 which is threaded through the tube 21, has its upper end secured to the slidable grip control member 19, and its lower end secured to an anchor fitting 27 bolted to the automobile floor 28. Moving the grip control member 19 toward the control lever 12 causes a depression of the accelerator pedal 24 in a manner to be explained later herein in connection with the operation of the entire control mechanism A.

Referring to the drawings in detail, Figs. 1 and 2 show the mechanism A as it appears when mounted on a conventional automobile of the well known type having a so-called automatic clutch or automatic drive mechanism embodied therein. As is well known, the only foot control pedals provided on such automobiles are a brake pedal 17 and an accelerator pedal 24, both of which are normally spring biased toward their upper limit of movement.

The gearing 10 comprises a housing 30 (Fig. 5), and a straight shaft portion 12a of the control lever 12 is journaled in ball bearings 31 and 32 mounted in the housing 30. A bevel gear 33 is secured by a pin 34 to the inner end of the control lever shaft portion 12a. A cross shaft 35 also is journaled in ball bearings 27 and 28 in a transversely extending portion 39 of the housing 30, and a second bevel gear 40 in meshed, driven engagement with the bevel gear 33, is secured by a pin 41 to the cross shaft 35.

A thrust bearing screw 42, screwed through a threaded axial hole 43 in a cap member 44, is adjusted to retain the bevel gears 33 and 40 in proper, adjusted, meshed condition. The cap 44 is secured by set screws 45 to cover the otherwise open end of the transverse housing portion 39. A lock nut 47 locks the thrust bearing screw 42 in adjusted condition.

The brake actuating lever arm 14 is fitted onto the projecting, squared end portion 35a of the cross shaft 35, and is retained thereon by a machine screw 48 screwed axially into a threaded hole provided therefor in the end of the cross shaft 35. The lever arm 14 and the control lever 12 are adjusted angularly when assembling the gearing 10 so as to allow a full upward swing of the control lever during a brake setting operation without interference with the steering wheel column 11, and so as to provide for a full operative depression of the brake pedal 17 upon such upward swing of the control lever.

The two half portions 39a and 39b of the transverse housing portion 39 are identical so that the cross shaft 35 and bevel gear 40 thereon may be inserted from the other end of the transverse housing portion to reverse the action of the gears on the lever arm 14 in the event that it is desired to reverse the control lever 12 for right hand operation. For such reversal the grip member 19 would also be swung over 180° from its position shown in Figs. 1–4 and 6. Since such a reversal would be well within the capability of any ordinary mechanic without further explanatory details, such further details are omitted.

The thrust link 15 which connects the lever arm 14 to the brake pedal 17 comprises yoked end members 49 and 50 pivotally connected, respectively, by pins 51 and 52, to the free end of the lever arm 14, and to a bracket 53 clamped to the shank 17a of the brake 17. A thrust rod 54, having threaded end portions 57 and 58, is screwed into holes provided therefor in the yoked end members 49 and 50, and is retained in adjusted position therein by lock nuts 55 and 56.

The accelerator pedal control assembly 18, best shown in Fig. 3, comprises the U-shaped metal base frame 20, with a track rod 59 secured to extend between the upturned end portions 20a and 20b of the base frame 20, and with the axis of said rod parallel to the central portion 20c of said frame. The grip control member 19 comprises a tubular carriage portion 60 mounted for free slidable movement along the track rod 59, and a transversely extending hand grip portion 61 secured to the tubular portion 60.

The retractable control wire 25 is anchored at 62 (Fig. 3) to the hand grip member 19, and extends therefrom into the flexible, lengthwise non-compressible tube 21. The tube 21 may be of a well known type conventionally used for Bowden wire controls, and the upper end of this tube is provided with a threaded adjusting tube 67 which is screwed into a threaded hole provided therefor in the upper end 20b of the frame 20. The tube 67 is secured in adjusted condition in the frame end portion 20b by a lock nut 68. The wire 25 passes through the flexible tube 21 and thence through a hole provided therefor in the bracket 23 on the accelerator pedal 24. The lower end of the wire 25 is secured to the anchor fitting 27, which in turn is secured by bolts 64 to the automobile floor 28. The flexible tube 21 and its enclosed wire 25 are both of sufficiently greater length than the shortest practical distance from the frame 20 to the accelerator pedal 24, so that a free, curved portion, for example the portion 21a (Figs. 2 and 6), will be provided.

The flexible tube 21 and its enclosed wire 25 are adjusted during installation so that when the grip member 19 is in its uppermost position as shown in Fig. 3, the accelerator pedal 24 will be in its normal, uppermost, spring biased condition shown in Fig. 1, and in solid lines in Fig. 6. Final adjustment may be provided by the threaded tube 67 on the upper end of the flexible tube 21.

To depress the accelerator pedal 14, the grip member 19 is drawn toward the control lever 12, i.e., from its solid to its broken line position of Fig. 3, by tightening the grip of the hand B. This action draws the wire 25 inwardly along the frame 20 as shown in broken lines in Fig. 3, and thereby shortens, and tends to straighten, the portion of the wire 25 remaining between the frame 20 and the floor anchor 27. Since, as was stated previously herein, the tube 21 which encloses the wire 25 is non-compressible lengthwise thereof, and since, further, the upper end of this tube is secured to the frame 20, the partial straightening of the tube 21 accomplished by this action urges the accelerator pedal 24 downwardly, as shown in Fig. 6. The amount of accelerator pedal depression is equal, substantially, to the amount the wire 25 is thus shortened.

During a throttle adjusting movement of the grip member 19 along the frame 20, the lateral hand grip extension 61 preferably is swung upwardly toward its broken line position of Fig. 4, which moves it clear of frictional engagement with the longitudinally extending base portion 20c of the frame 20 upon which it is mounted. After the grip control member 19 has been moved to a desired adjusted position along the frame 20, however, the weight of the fingers again may be rested on the lateral extension 61 to urge the latter downwardly toward its solid line position of Fig. 4, in which latter position its frictional engagement with the longitudinally extending frame base portion 20c tends to frictionally retain the grip control member 19 against displacement. Upon releasing the grip member 19 entirely, the usual accelerator pedal return spring, not shown, which tends to maintain the accelerator pedal 24 in its normal, raised, unoperated condition, will cause the grip member 19 to return to its normal uppermost position, shown in Fig. 2 and in solid lines in Figs. 3 and 6.

In operating the control mechanism A, it will be assumed that the control mecanism is mounted on an automobile as shown in Figs. 1 and 2. It will also be assumed that the automobile engine has been started and is idling, and that to start the automobile in motion, the usual gear selecting controls have been operated to place the drive mechanism of the automobile in condition to move the latter forward or backwards as desired upon accelerating the speed of the engine.

The operator then places one hand B (Fig. 3) on the outer or hand grip portion 12b of the control lever 12 with the fingers 65 of said hand resting over the transversely extending portion 61 of the grip control member 19. By tightening the grip on the extension 61 to move the grip control member 19 toward the control lever 12, the accelerator control wire 25 is drawn rearwardly in the direction of the arrow shown in Figs. 3 and 4, thereby shortening by an equal amount the length of the wire between the frame 20 and the anchor fitting 27. This action, as explained previously herein, causes the flexible tube 21 to partially straighten, thereby to depress the accelerator pedal 24. Such depression of the accelerator pedal speeds up the automobile engine, and, by means of the usual automatic clutch or drive mechanism with which the automobile is equipped as stated previously herein, causes the automobile to move off in the pre-selected drive.

Since operation of the control lever 12 within its range of movement does not change the length of the wire 25 between the frame 20 and the floor anchor 27, control of the brake pedal 17 by means of the control lever 12 is independent of the operation of the accelerator pedal control grip mechanism 18. The control lever 12 is urged to its lowermost, brake-releasing position shown in Figs. 1 and 2 by the action of the usual spring, not shown, with which automobile brake pedals are conventionally equipped. Movement of the control lever 12 upwardly does, however, through the action of the gearing 10, lever arm 14, and thrust link 15, depress the brake pedal 17 as required to apply the brakes of the automobile.

The invention provides an improved, simple and effective throttle and brake control mechanism for an automobile, and one which can be handled entirely by a hand of the operator. Installation of the invention on an automobile requires no disfiguring change of the conventional controls provided on automobiles of the type having a so-called automatic clutch or automatic drive mechanism incorporated therewith. Also, control mechanism embodying the invention can be easily transferred from one standard automobile of such type to another.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims:

1. A one-hand control mechanism for the brake and accelerator pedals of an automobile, and comprising a gear housing adapted to be fixedly mounted on the steering post of an automobile, gearing mounted in said housing, a control lever operatively connected to said gearing, a transversely extending arm on said lever and positioned for free swinging movement beneath the steering wheel, and within easy reach of one hand of an operator of such automobile, means operatively connected to the gearing and adapted to be connected to the brake pedal of such automobile, whereby an upward swinging movement of the control lever will depress such brake pedal, a frame element mounted on the control lever, a track rod parallel to said frame element and spaced therefrom, a hand actuated member mounted for combined pivotal and longitudinal slidable movement on said rod and swingable into frictional engagement with said frame element, a flexible tube, non-compressible lengthwise and with its upper end secured relative to the frame element, the lower end of said tube being adapted to be connected to an accelerator pedal, a wire threaded through said tube, the upper end of the wire being attached to the hand actuated member for movement of the wire through the tube upon movement of the hand actuated member along the track rod, the lower end of the wire being adapted to be anchored to a fixed automobile element below such accelerator pedal, the wire and its enclosing tube being of a length to have a free, curved portion therein when the control mechanism is mounted on an automobile, whereby, the frame and its hand actuated member are free for movement with the transversely extending arm upon which they are mounted without changing the setting of a throttle to which the wire is connected, and upon a movement of the hand actuated member along the track rod the wire is drawn inwardly along the frame, thereby shortening the length of the wire between the control lever and the anchor member to straighten the free, curved portion of the tube and depress such accelerator pedal, the swinging of the hand actuated member into frictional engagement with the frame element tending to retain the hand actuated member and the accelerator pedal in adjusted position.

2. A hand control mechanism for the accelerator pedal of an automobile comprising a straight frame element adapted to be mounted on an automobile within reach of a driver's hand, a track rod mounted parallel to, and spaced from said frame element, a flexible tube non-compressible lengthwise thereof and with its upper end secured relative to said frame element and in substantial alignment with the track rod, the lower end of said tube being adapted to be connected to the accelerator pedal of an automobile upon which the control mechanism is mounted, a grip actuated member mounted for combined pivotal and longitudinal sliding movement on said track rod, and of a length, and positioned to engage said frame element upon a downward pivotal movement of the grip actuated member about said track rod, a wire threaded through said tube, the upper end of the wire being attached to the grip actuated member and the lower end of the wire being adapted to be anchored to a fixed automobile element below an accelerator pedal to which the tube is connected, the wire and its enclosing tube being of a length to have a free, curved portion therein when the control mechanism is mounted on an automobile, whereby, upon a gripped movement of the grip actuated member the wire is drawn inwardly along said frame, thereby shortening the length of the wire between the frame and the anchor member and thereby tending to straighten the free, curved portion of the tube and depress such accelerator pedal, the weight of the operator's hand moving the hand grip portion pivotally downward into frictional engagement with said frame element thereby to frictionally assist in retaining the grip actuated member and an accelerator pedal to which the tube is connected in adjusted position.

3. A hand control mechanism for the accelerator pedal of an automobile and comprising a straight frame element adapted to be mounted on an automobile within reach of a driver's hand, a track parallel to and spaced from said frame element, a flexible tube non-compressible lengthwise thereof and with its upper end secured relative to said frame element the lower end of said tube being adapted to be connected to the accelerator pedal of an automobile upon which the control mechanism is mounted, a grip actuated member mounted for combined pivotal and slidable movement along said track, a laterally extending grip arm on said grip actuated member and swingable from a raised position clear of said frame element downwardly into frictional engagement therewith, a wire threaded through said tube, the upper end of the wire being attached to the grip actuated member and the lower end of the wire being adapted to be anchored to a fixed automobile element below such accelerator pedal, the wire and its enclosing tube being of a length to have a free, curved portion therein when the control mechanism is mounted on an automobile, whereby, upon a gripped movement of the grip arm of the grip actuated member the wire is drawn inwardly along said track, thereby shortening the length of the wire between the frame element and the anchored lower end of the wire and tending to straighten the free, curved portion of the tube and depress such accelerator pedal, the grip member being free for movement lengthwise along said track when the grip arm is swung upwardly clear of said frame element, and being frictionally restrained against such movement when said grip arm is swung downwardly into engagement with said frame element.

References Cited in the file of this patent

UNITED STATES PATENTS

| | | |
|---|---|---|
| 2,465,183 | Allen | Mar. 22, 1949 |
| 2,602,348 | Wilson | July 8, 1952 |
| 2,664,979 | Parent | Jan. 5, 1954 |

FOREIGN PATENTS

| | | |
|---|---|---|
| 404,789 | Italy | July 2, 1943 |
| 669,963 | Great Britain | Apr. 9, 1952 |
| 710,640 | Great Britain | June 16, 1954 |
| 745,253 | Great Britain | Feb. 22, 1956 |
| 886,718 | France | July 12, 1943 |
| 914,217 | Germany | June 28, 1954 |